(12) United States Patent
Kapadia et al.

(10) Patent No.: US 8,484,204 B2
(45) Date of Patent: Jul. 9, 2013

(54) DYNAMIC METADATA

(75) Inventors: Arshish C. Kapadia, Issaquah, WA (US); Tarkan Sevilmis, Redmond, WA (US); Mohammed Nazeeruddin, Bellevue, WA (US); Targo Tennisberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 12/200,495

(22) Filed: Aug. 28, 2008

(65) Prior Publication Data

US 2010/0057784 A1 Mar. 4, 2010

(51) Int. Cl.
*G06F 17/30* (2006.01)

(52) U.S. Cl.
USPC ......................................... 707/726

(58) Field of Classification Search
USPC .............. 707/707, 726, E17.095, E17.102, 707/E17.103
See application file for complete search history.

(56) References Cited

U.S. PATENT DOCUMENTS

| | | | | |
|---|---|---|---|---|
| 5,047,876 | A * | 9/1991 | Genheimer et al. | 360/46 |
| 5,159,501 | A * | 10/1992 | Genheimer | 360/45 |
| 6,609,123 | B1 | 8/2003 | Cazemier et al. | |
| 7,356,622 | B2 * | 4/2008 | Hattrup et al. | 710/33 |
| 7,631,314 | B2 * | 12/2009 | Joseph et al. | 719/313 |
| 7,644,414 | B2 * | 1/2010 | Smith et al. | 719/328 |
| 7,810,106 | B2 * | 10/2010 | Kapadia et al. | 719/328 |
| 2001/0037228 | A1 | 11/2001 | Ito et al. | |
| 2002/0152210 | A1 * | 10/2002 | Johnson et al. | 707/9 |
| 2003/0144892 | A1 * | 7/2003 | Cowan et al. | 705/8 |
| 2003/0182452 | A1 * | 9/2003 | Upton | 709/246 |
| 2003/0233655 | A1 * | 12/2003 | Gutta et al. | 725/46 |
| 2004/0098744 | A1 * | 5/2004 | Gutta | 725/46 |
| 2005/0015619 | A1 * | 1/2005 | Lee | 713/201 |
| 2005/0027674 | A1 | 2/2005 | Potter et al. | |
| 2005/0086343 | A1 | 4/2005 | Chellis | |
| 2005/0091276 | A1 | 4/2005 | Brunswig et al. | |

(Continued)

FOREIGN PATENT DOCUMENTS

| | | |
|---|---|---|
| CN | 1568473 A | 1/2005 |
| CN | 1655129 A | 8/2005 |

(Continued)

OTHER PUBLICATIONS

Lefter, SQL Server 2005 Dynamic Management and Views, Mar. 4, 2005; pp. 1-15; http://microsoft.apress.com/feature/71/sql-server-2005-dynamic-management-and-views.

(Continued)

*Primary Examiner* — Sheree Brown
(74) *Attorney, Agent, or Firm* — Merchant & Gould (57) ABSTRACT

A computing device having a dynamic metadata model includes an interface module, an algorithm module and a registration module. The interface module includes an interface that defines one or more API functions for obtaining metadata using an algorithm. At least one of the API functions is used with a plurality of algorithms. Each of the plurality of algorithms is associated with a business system. The algorithm module includes one or more algorithms that implement the API functions defined in the interface. The one or more algorithms provide metadata without accessing a metadata database. Each of the one or more algorithms is associated with a business system. The metadata is associated with API functions of the business system. The registration module registers the one or more algorithms on the computing device.

16 Claims, 8 Drawing Sheets

```
600     internal interface IDynamicMetadataProvider
        {
  602    NamedEntityDictionary GetEntities(ILobSystem lobSystem);
  604    NamedLobSystemDictionary GetLobSystem(IEntity entity);
  606    NamedMethodDictionary GetMethods(IEntity entity);
  608    NamedEntityDictionary GetEntities(IMethod method);
  610    ParameterCollection GetParameters(IMethod method);
  612    IAccessControlList
           GetAccessControlList(
             IAccessControlledMetadataObject accessControlledMetadataObject);

FilterDescriptorCollection GetFilterDescriptors(IMethod method);
         TypeDescriptorCollection GetFilterDescriptorTypeDescriptors(IFilterDescriptor filterDescriptor);
         NamedDataClassDictionary GetDataClasses(ILobSystem lobSystem);
  616    NamedActionDictionary GetActions(IEntity entity);
         NamedActionParameterDictionary GetActionParameters(IAction action);
         IdentifierCollection GetIdentifiers(IEntity entity);
         TypeDescriptorCollection GetTypeDescriptors(ITypeDescriptor typeDescriptor);
        }
```

U.S. PATENT DOCUMENTS

| | | |
|---|---|---|
| 2005/0114764 A1* | 5/2005 | Gudenkauf et al. .......... 715/517 |
| 2005/0177545 A1 | 8/2005 | Buco |
| 2005/0177602 A1 | 8/2005 | Kaler et al. |
| 2005/0228803 A1* | 10/2005 | Farmer et al. ................. 707/100 |
| 2006/0085406 A1* | 4/2006 | Evans et al. ....................... 707/3 |
| 2006/0106856 A1* | 5/2006 | Bermender et al. .......... 707/102 |
| 2006/0136305 A1* | 6/2006 | Fitzsimmons et al. .......... 705/26 |
| 2006/0224613 A1* | 10/2006 | Bermender et al. .......... 707/102 |
| 2006/0242557 A1* | 10/2006 | Nortis, III ..................... 715/509 |
| 2006/0294051 A1* | 12/2006 | Kapadia et al. ................... 707/1 |
| 2007/0033212 A1 | 2/2007 | Fifield et al. |
| 2007/0100851 A1 | 5/2007 | Golovchinsky |
| 2007/0100967 A1* | 5/2007 | Smith et al. ................... 709/219 |
| 2007/0124334 A1 | 5/2007 | Pepin |
| 2007/0168542 A1* | 7/2007 | Gupta et al. .................. 709/231 |
| 2008/0028308 A1 | 1/2008 | Brownlee |
| 2008/0065688 A1* | 3/2008 | Shenfield ................... 707/103 R |
| 2008/0086350 A1 | 4/2008 | Ponessa |
| 2008/0140692 A1* | 6/2008 | Gehring ........................ 707/101 |

FOREIGN PATENT DOCUMENTS

| | | |
|---|---|---|
| CN | 1664793 A | 9/2005 |
| CN | 1916842 A | 2/2007 |
| WO | WO 2010/024983 A2 | 3/2010 |

OTHER PUBLICATIONS

Bea and IBM Publish Service Data Objects (SDO) Specifications, Nov. 25, 2003; pp. 1-4; http://xml.coverpages.org/ni2003-11-25-a.html.

Jumper Newsletter; Making BPEL Transformations Dynamic; Oct. 2006; pp. 1-2; http://www.jumpernetworks.com/Making_BPEL_Transformations_Dynamic.pdf.

Office Action issued Aug. 31, 2012, in Chinese Patent Application No. 200980134110.4, filed Jul. 19, 2009 (with English-language translation).

* cited by examiner

```
internal interface IDynamicMetadataProvider
{
    NamedEntityDictionary GetEntities(ILobSystem lobSystem);
    NamedLobSystemDictionary GetLobSystem(IEntity entity);
    NamedMethodDictionary GetMethods(Ientity entity);
    NamedEntityDictionary GetEntities(IMethod method);
    ParameterCollection GetParameters(IMethod method);
    IAccessControlList
        GetAccessControlList(
            IAccessControlledMetadataObject accessControlledMetadataObject);
    FilterDescriptorCollection GetFilterDescriptors(IMethod method);
    TypeDescriptorCollection GetFilterDescriptorTypeDescriptors(IFilterDescriptor filterDescriptor);
    NamedDataClassDictionary GetDataClasses(ILobSystem lobSystem);
    NamedActionDictionary GetActions(IEntity entity);
    NamedActionParameterDictionary GetActionParameters(IAction action);
    IdentifierCollection GetIdentifiers(IEntity entity);
    TypeDescriptorCollection GetTypeDescriptors(ITypeDescriptor typeDescriptor);
}
```

602 — NamedEntityDictionary GetEntities(ILobSystem lobSystem);
604 — NamedLobSystemDictionary GetLobSystem(IEntity entity);
606 — NamedMethodDictionary GetMethods(Ientity entity);
608 — NamedEntityDictionary GetEntities(IMethod method);
610 — ParameterCollection GetParameters(IMethod method);
612 — IAccessControlList GetAccessControlList(...)
616 — { FilterDescriptorCollection ... TypeDescriptorCollection ... }

DYNAMIC METADATA

BACKGROUND

Metadata is data about data. In a business context, metadata can be used to define information about a business application. For example, metadata can define the business entities with which the business application interacts and the methods available in the business application to obtain business data. Metadata is stored separately from the actual data used in the business application.

Metadata models describe the APIs exposed by business systems. These models are utilized by a runtime engine to map or transform the APIs on the business systems into a canonical business data access API provided by the runtime engine. Thus, when a user provided application invokes the canonical API, depending on the metadata model, the appropriate API on the business system is invoked. Changing the metadata model changes the behavior of the application without needing to recompile or rewrite the application.

The metadata models are typically provided in a static format by a design tool or a text editor. When a business data operation requests metadata, the metadata is typically obtained from a metadata store. The obtained metadata is used by the runtime engine to perform business data operations. For example, a business data operation may be obtaining information about a customer given a customer ID. This business data operation may need metadata about the operation. When a request for this metadata is made, the metadata store returns the name and parameters of this method along with any other information that is required to invoke this method. The method is an API specific to the business system that includes the customer information.

The metadata store includes APIs for business systems described in the metadata model. Some business systems have APIs that are similar in syntax. For example, a method for obtaining information about a product given a product ID may be similar in syntax to a method for obtaining information about a customer given a customer ID. However, with a static metadata model, metadata for each API is typically included separately in the metadata store, even if the syntaxes are similar. This increases the storage requirements for the metadata store. In addition, if the APIs change, the metadata model needs to be changed to accommodate the modifications.

SUMMARY

According to one aspect, a computing device including a dynamic metadata model has an interface module, the interface module including an interface that defines one or more API functions for obtaining metadata using an algorithm, at least one of the API functions being used with a plurality of algorithms, each of the plurality of algorithms being associated with a business system; an algorithm module, the algorithm module including one or more algorithms that implement the API functions defined in the interface, the one or more algorithms providing metadata without accessing a metadata database, each of the one or more algorithms being associated with a business system, the metadata being associated with API functions of the business system; and a registration module that registers the one or more algorithms on the computing device, each of the one of more algorithms being associated with a business system.

According to another aspect, a method for obtaining metadata dynamically from a data store includes: storing a metadata interface on a computing device, the metadata interface including definitions of one or more API functions for obtaining metadata, at least one of the API functions being structured to obtain metadata from a plurality of business systems; storing one or more algorithms on the computing device, each of the one or more algorithms implementing one or more of the API functions defined in the interface, at least one API function implementation including one or more API functions specific to a business system; registering the one or more algorithms on the computing device, each of the one or more algorithms registered for a specific business system; storing in the data store pointers to the one or more algorithms, a pointer being stored for each registered algorithm, each pointer representing the memory location of a registered algorithm; initiating an operation on the computing device to obtain metadata; calling a function on the computing device that uses a data store location in which one of the pointers is stored; and executing the interface API functions implemented in the algorithm associated with the pointer, the algorithm implementation of the one or more of the interface API functions using the one or more API functions specific to a business system to obtain data from the business system, the data being transformed into metadata by the algorithm.

According to yet another aspect, a computer readable storage medium having computer-executable instructions that when executed by a computing device, cause the computing device to perform steps comprising: storing a metadata interface on a computing device, the metadata interface including definitions of one or more API functions for obtaining metadata, at least one of the API functions being structured to obtain metadata from a plurality of business systems; storing one or more algorithms on the computing device, each of the one or more algorithms implementing one or more of the API functions defined in the interface; registering the one or more algorithms on the computing device, each of the one or more algorithms registered for a specific business system; initiating an operation on the computing device to obtain metadata; executing one or more of the interface API functions implemented in the algorithm to obtain metadata in at least one of: using one or more API functions specific to the business system to obtain data from the business system, the business system data being transformed into metadata by the algorithm; and providing metadata using logic based on knowledge of patterns in at least two of the API functions specific to the business system.

This Summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

The present application is directed to systems and methods for obtaining metadata dynamically for a business system.

In example embodiments described herein, a dynamic metadata model is described that provides metadata for a plurality of business systems. The metadata relates to the entities, methods, parameters, type descriptors, etc. that are associated with API functions specific to a business system. Some examples of entities are customers, products, employees, etc.

The dynamic metadata model provides one or more algorithms, each associated with a specific business system, which returns metadata without the need to access a metadata database. The algorithms may make use of stereotypical patterns in the API functions of the business system to infer the metadata based on knowledge of the stereotypical patterns. The algorithms may also call the API functions to obtain data from the business system, which is transformed into metadata by the algorithm.

Figure 1:
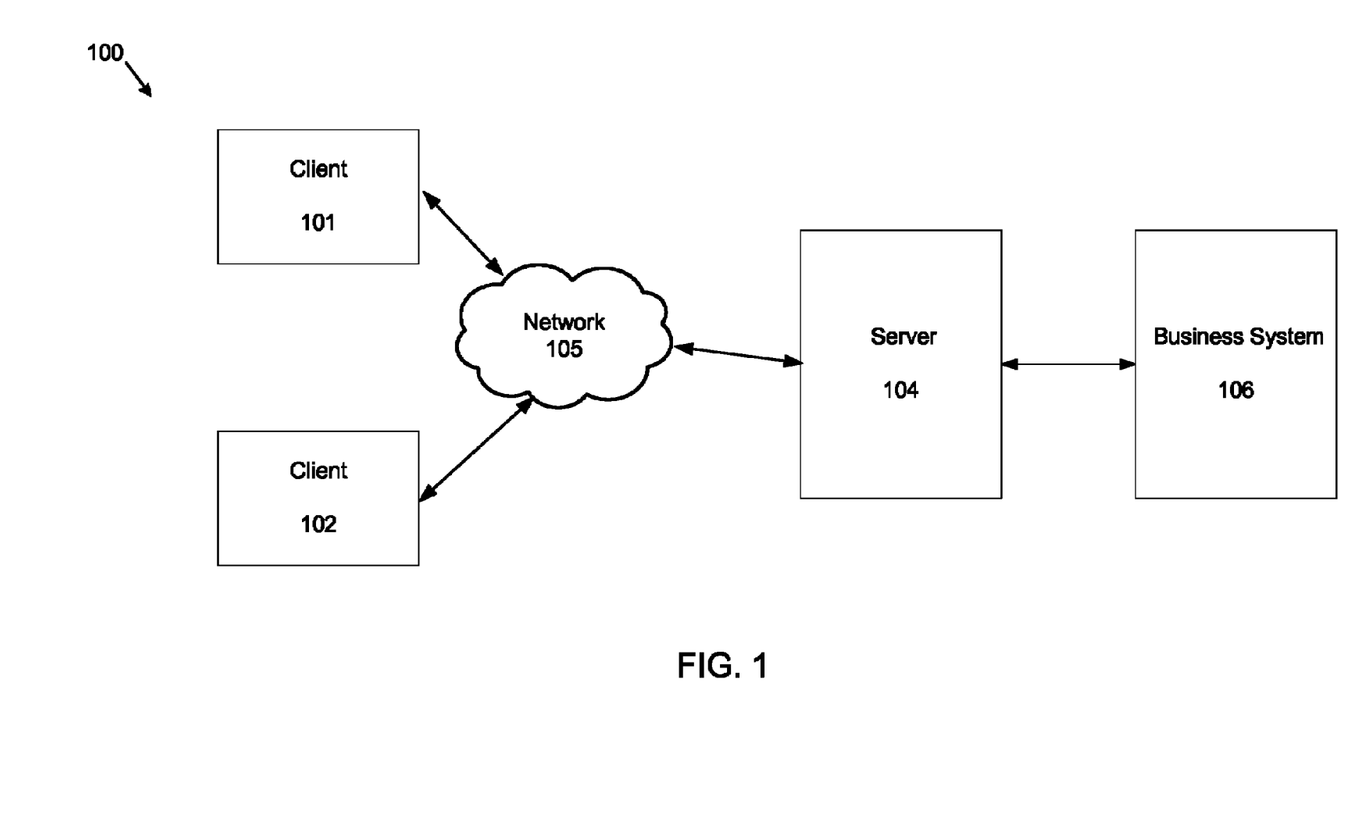
FIG. 1 shows an example system for using dynamic metadata or static metadata for calling business system APIs.

FIG. 1 shows an example system 100 for using dynamic metadata or static metadata for calling business system APIs. The system 100 includes clients 101, 102, a server 104, and a business system 106. More or fewer clients, servers, and business systems can be used.

In example embodiments, the clients 101, 102 are computing devices, such as desktop computers, laptop computers, personal data assistants, or cellular devices. The clients 101, 102 can include input/output devices, a central processing unit ("CPU"), a data storage device, and a network device.

The server 104 is a business server that is accessible through a network 105. The server 104 can implement a suite of business processes that may include file sharing, content management, records management and business intelligence. The server 104 can include input/output devices, a central processing unit ("CPU"), a data storage device, and a network device.

In example embodiments, the server 104 can be located within an organization or can be part of an Internet-based shared document system. An example business server is Microsoft Office SharePoint Server 2007 provided by Microsoft Corporation. Other business servers can be used.

The business system 106 includes one or more business systems that provide business applications. An example business system is Microsoft SQL Analysis Services provided by Microsoft Corporation. Another example is Windows SharePoint Services provided by Microsoft Corporation. The business system 106 is also accessible through the server 104 or another network.

Figure 2:
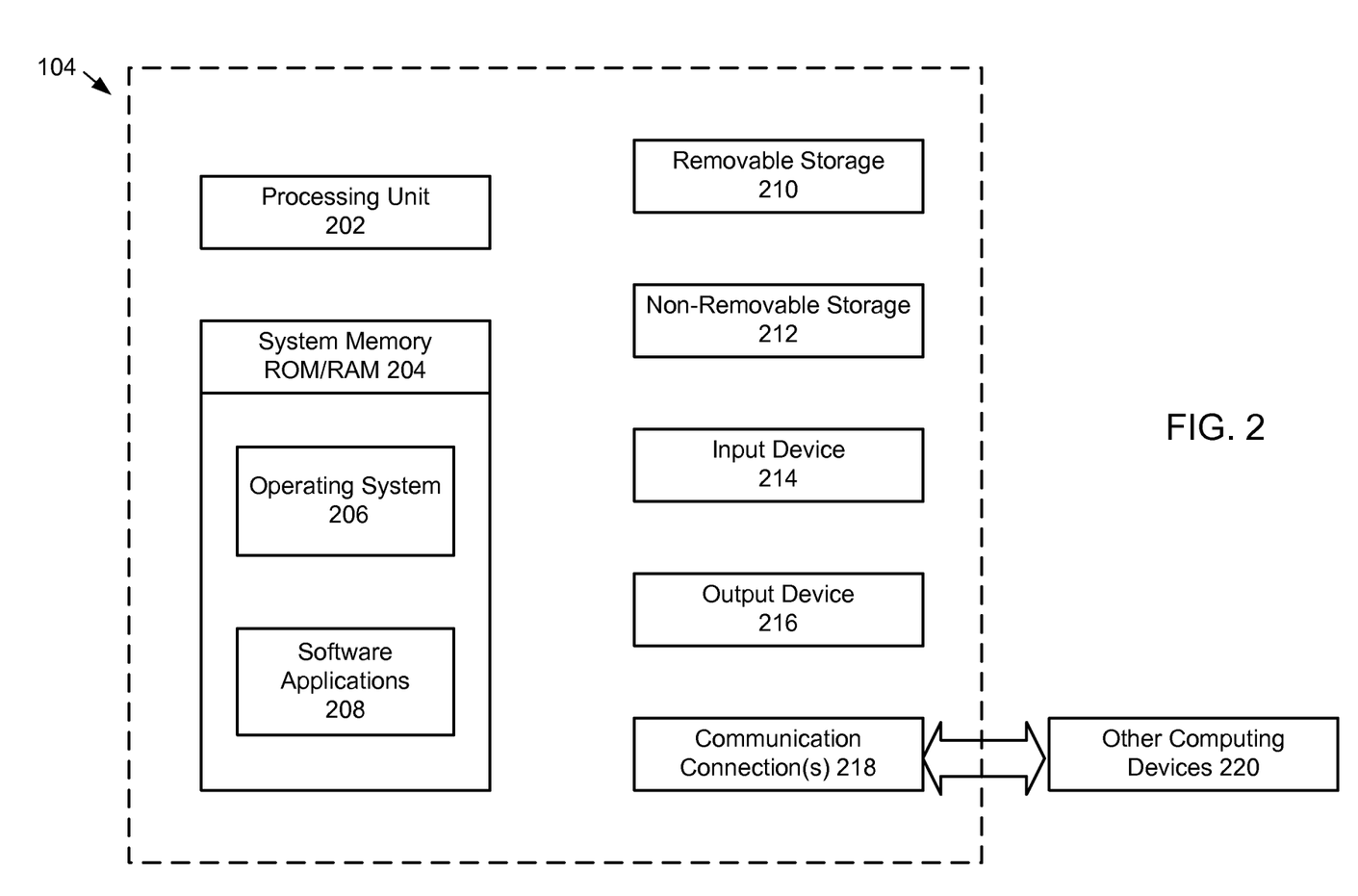
FIG. 2 shows an operating environment with a system in which dynamic metadata can be obtained.

Referring now to FIG. 2, in example embodiments, the server 104 shown in FIG. 1 is a computing device. For example, the server 104 can be a desktop or laptop computer. Those skilled in the art will appreciate that the disclosed embodiments can be implemented with other computer system configurations, including minicomputers, mainframe computers, and the like. The embodiments may also be practiced in distributed computing environments, where tasks are performed by remote processing devices that are linked through a communications network. In a distributed computing environment, program modules may be located in both local and remote memory storage devices. Embodiments may be implemented as a computer process (method), a computing system, or as an article of manufacture, such as a computer program product or computer readable media. The computer program product may be a computer readable storage media readable by a computer system and encoding a computer program of instructions for executing a computer process. The computer program product may also be a propagated signal on a carrier readable by a computing system and encoding a computer program of instructions for executing a computer process.

With reference to FIG. 2, the server 104 typically includes at least one processing unit 202 and system memory 204. Depending on the exact configuration and type of computing device, the system memory 204 may be volatile (such as RAM), non-volatile (such as ROM, flash memory, etc.) or some combination of the two. System memory 204 typically includes an operating system 206 suitable for controlling the operation of a networked personal computer, such as the WINDOWS® operating systems from Microsoft Corporation of Redmond, Wash. or a server, such as Windows SharePoint Server 2007, also from Microsoft Corporation of Redmond, Wash. The system memory 204 may also include one or more software applications 208 and may include program data.

The server 104 may have additional features or functionality. For example, the server 104 may also include additional data storage devices (removable and/or non-removable) such as, for example, magnetic disks, optical disks, or tape. Such additional storage is illustrated in FIG. 2 by removable storage 210 and non-removable storage 212. Computer readable storage media may include volatile and nonvolatile, removable and non-removable media implemented in any method or technology for storage of information, such as computer readable instructions, data structures, program modules, or other data. System memory 204, removable storage 210 and non-removable storage 212 are all examples of computer readable storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server 104. Any such computer storage media may be part of server 104. Server 104 may also have input device(s) 214 such as keyboard, mouse, pen, voice input device, touch input device, etc. Output device(s) 216 such as a display, speakers, printer, etc. may also be included.

The server 104 may also contain communication connections 218 that allow the device to communicate with other computing devices 220 (e.g., clients 101, 102) over a network, such as network 105, in a distributed computing environment, for example, an intranet or the Internet. Communication connection 218 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. The term computer readable media as used herein includes both storage media and communication media.

Clients 101, 102 can be configured in a manner similar to that of the server 104 described above.

Figure 3:
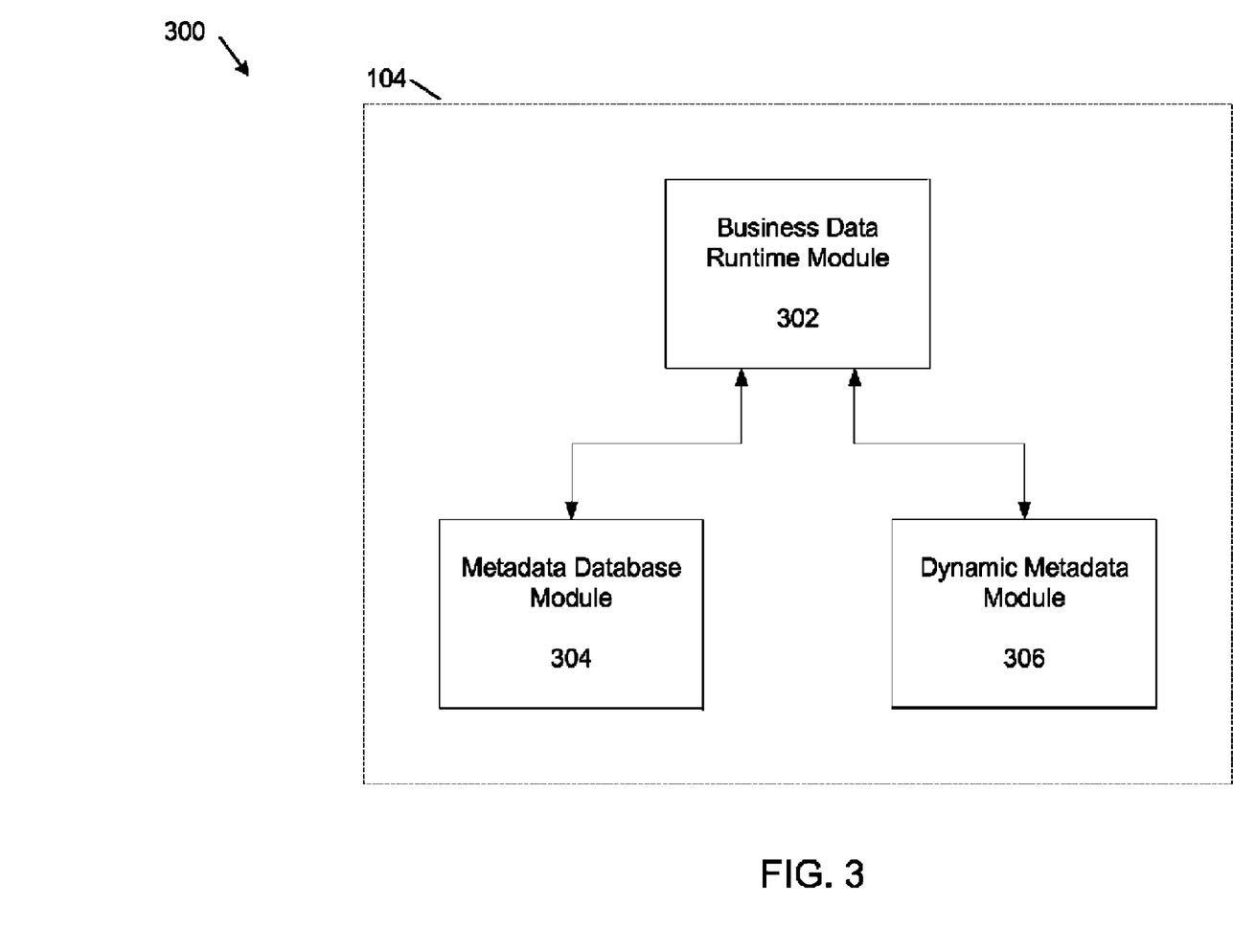
FIG. 3 shows an example server that includes an example business data runtime module, an example metadata database module and an example dynamic metadata module.

FIG. 3 shows, in more detail, example logical portions of the server 104. The server 104 includes an example business data runtime module 302, an example metadata database module 304 and an example dynamic metadata module 306. In some embodiments the metadata database module 304 and the dynamic metadata module 306 may be on separate servers.

The example business data runtime module 302 comprises software running on the server 104 that catalogs and obtains data from business systems. The business data runtime module 302 obtains data from the business systems using API calls specific to the business system. Information about the APIs (e.g. methods, parameters, etc) is contained in metadata that can be accessed from the example metadata database module 304 using a static model or dynamically from the example dynamic metadata module 306. In some embodiments metadata can be accessed from both the example metadata database module 304 and the example dynamic metadata module 306.

The example metadata database module 304 includes metadata objects associated with a business system. Metadata objects may include entities used in the business system, for example lists stored in WSS or cubes stored in SQL Server Analysis Services. Other metadata objects may include methods, parameters and parameter descriptors associated with each method, security authorization information, filtering information, etc. The metadata objects are interlinked, typically in a graph computer structure including a plurality of nodes and edges defining relationships between the nodes. The example metadata database module 304 also includes an inventory of business data types and the business systems in which they reside. Some examples of business data types are customers, orders, products and employees.

The example dynamic metadata module 306 includes one or more algorithms that are associated with specific business systems. The algorithms are exposed by an interface included with the business data runtime module 302. The interface defines metadata API functions that are used to dynamically obtain metadata using the one or more algorithms. The algorithms include code that implements the metadata API functions defined in the interface.

Figure 4:
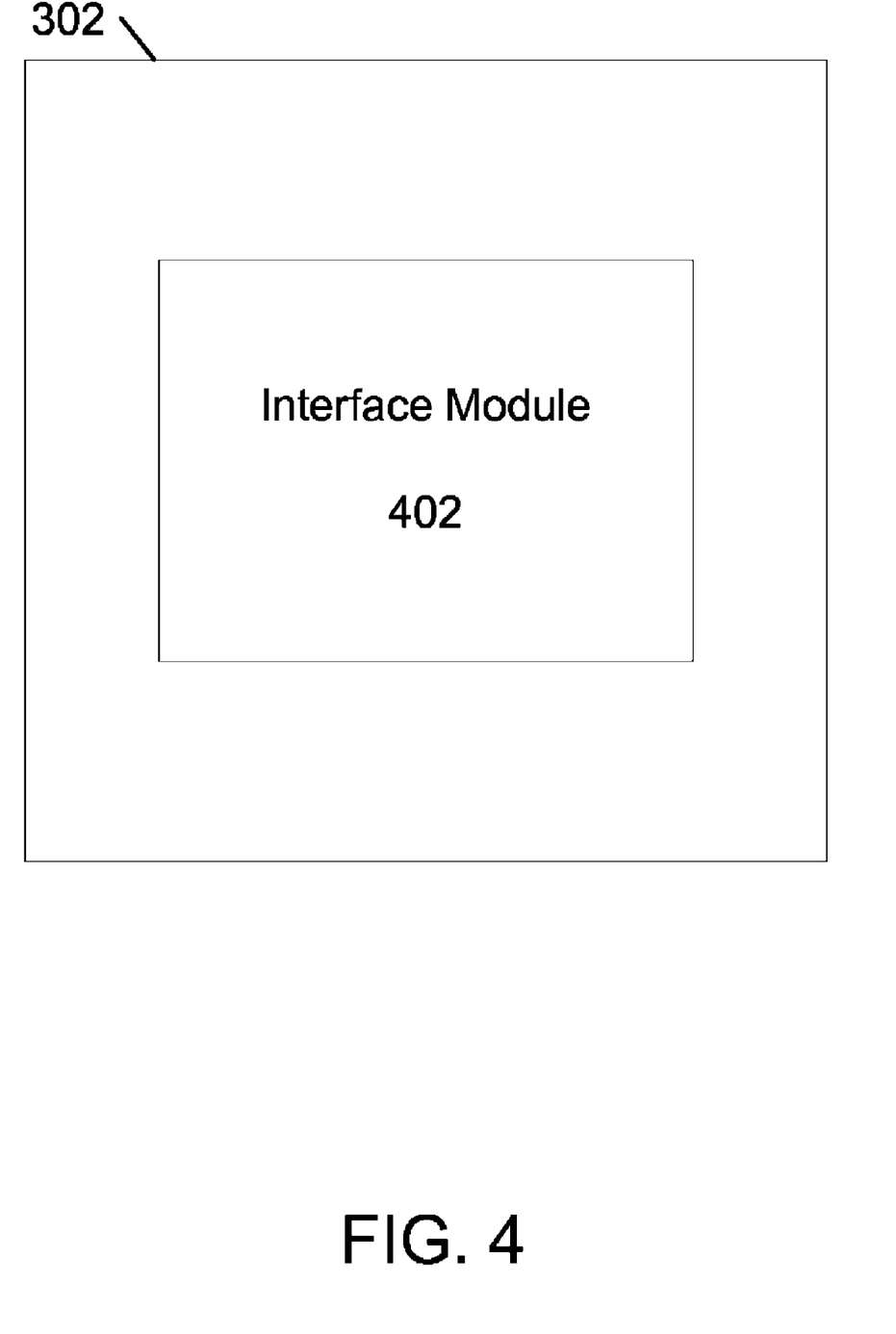
FIG. 4 shows an example business data runtime module that includes an interface module.

FIG. 4 shows additional details of the business data runtime module 302. The business data runtime module 302 includes an interface module 402. The example interface module 402 provides a metadata interface that can be generically applied to a plurality of business systems. The interface defines metadata API function calls that can be used with each of the plurality of business systems to return metadata about API functions that are specific to a business system.

Figure 5:
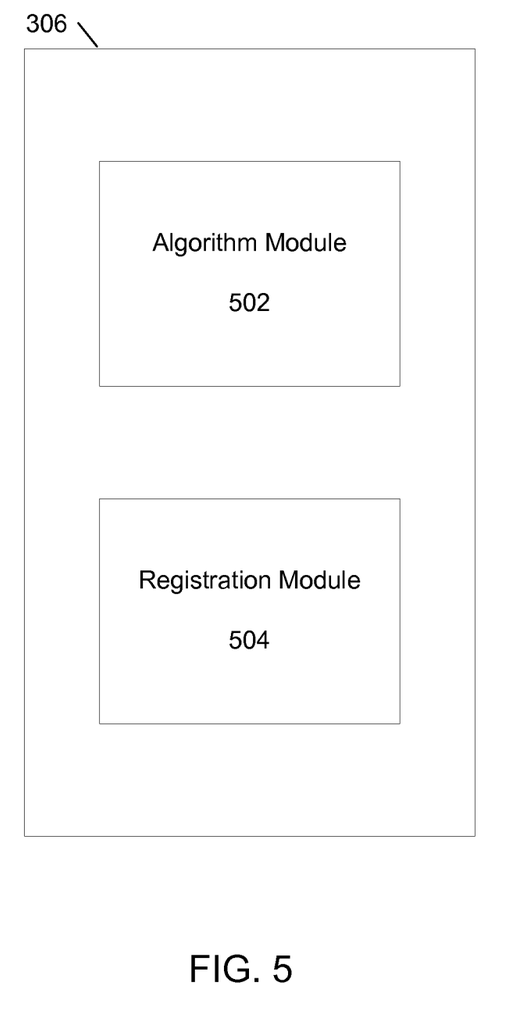
FIG. 5 shows an example dynamic database module that includes an algorithm module and a registration module.

FIG. 5 shows additional details of the dynamic metadata module 306. The dynamic metadata module 306 includes an algorithm module 502, and a registration module 504.

For example, there may be a GetEntities function call for a business system that returns all the entities stored for that business system. For example, if the business system is Windows SharePoint Services (WSS), WSS may be a parameter in the GetEntities function. In this example, the GetEntities function returns information about the lists stored for an instance of WSS. In another example, there may be a GetMethods function that takes an entity such as a WSS list as a parameter. The GetMethods function returns all the methods that are associated with the entity.

The example algorithm module 502 provides algorithms that are oriented to specific business systems and that include business system specific implementations of the metadata API functions defined in the interface module 402. The business systems are typically those that have a well-defined API. For example, WSS is a business system that has an API for determining all lists that are installed and the number of columns in each list. Similarly, SQL Server Analysis Services is a business system that has APIs for determining the names of the cubes stored and the dimensions of those cubes.

Each algorithm includes code to implement the metadata API functions defined in interface module 402, the code implementation sometimes including additional API functions that obtain data from a business system. For example, for WSS, a GetEntities metadata function implementation in the algorithm for WSS may use APIs that obtain all the lists stored in WSS and information about how many columns are in each list. For SQL Server Analysis Services, a GetEntities metadata function implementation in the algorithm for SQL Server Analysis Services may use APIs to obtain the cubes used and the dimensions of those cubes. The WSS GetEntities implementation may use the number of columns in each list in conjunction with logic in the WSS algorithm and other API function calls to determine the entities for WSS. Similarly, the SQL Server Analysis Services GetEntities algorithm implementation may use the dimensions of the cubes in conjunction with logic in the SQL Server Analysis Services algorithm and other API function calls to determine the entities for SQL Server Analysis Services. Although the number of columns in the list and the dimensions of the cubes are data, the entity information returned is metadata. Each algorithm uses logic to transform the data into metadata. In this way, one metadata API function call defined in an interface can obtain metadata from a plurality of business systems.

For some business systems, particularly those that may not have APIs that are common across industries and applications, for example SAP, the algorithm associated with the business system in the algorithm module 502 may logically infer the metadata from stereotypical patterns in the API of the business system. For example, it may be observed that for a particular business system there is a Find function that returns an entity based on an ID. Some examples are find a customer given an ID, find an employee given an ID and find a product given an ID. If a dynamic metadata model is used, the algorithm for the business system infers that for a GetMethods call for this business system where the entity is a customer, the method that should be returned is FindCustomer(ID). Similarly, for a GetMethods call where the entity is a product, the method that should be returned is FindProduct(ID). This inference is done independently of calls to the metadata database module 304, based on the observed stereotypical patterns. As a result, the metadata database module 304 does not need to store a separate method entry for each such entity. Furthermore, if a new entity, for example Foo, is added at a later date, the algorithm provides the method information without any code updates. The example algorithm module 502 would simply return FindFoo(ID).

Each algorithm is designed to obtain metadata for a specific entity so that metadata is only generated when it is needed. For example, if the entity is a customer, the algorithm only uses interface functions for the customer entity. This may include methods, parameters and parameter descriptions related to the customer.

Each algorithm also provides an initializer API, typically a class constructor, with connection information specific to the business system associated with the algorithm. For example, the SQL Server Analysis Server DynamicMetadataProvider has a constructor that includes a connection string to a SQL Analysis Server and the name of a particular cube within it. In addition, each algorithm provides an API to obtain any metadata object in the metadata model as a starting point. This starting point API is parameterless and takes no other metadata object reference as input. For example, the SQL Server Analysis Server DynamicMetadataProvider has a method that returns a collection of entities that represent all possible dimensions in the cube the SQL Server Analysis Server DynamicMetadataProvider was initialized with.

The example registration module 504 registers algorithms associated with business systems. Typically, there is one algorithm registered for a specific business system. The registration module maps an algorithm to a business system so that the correct algorithm is executed when a dynamic metadata call is made.

The example registration module 504 permits the business data runtime module 302 to mix static and dynamic metadata models. With a static metadata model, the metadata is all contained in a metadata database. For example, the methods, parameters, types, etc. that are associated with each entity are stored within the metadata database. However, it is possible to substitute a pointer to an algorithm in a metadata database location. In this way, when the metadata database location is accessed (for example, by a metadata runtime call), the algorithm is executed and metadata is returned via the algorithm instead of from the metadata database.

For example, when a call is made to GetEntities for a static model, a call is made to a metadata database and entities stored in the metadata database are returned for a particular instance of a business system application. For the dynamic model, when a call is made to GetEntities, the metadata database returns a pointer to the algorithm registered for the business system. The algorithm returns the entities for the instance of the business system application by inferring the metadata or by using API calls specific to the business system as discussed above. With the static model, a static metadata needs to be stored for each entity of the business system, for example each WSS list. However, for the dynamic model, the same algorithm can be used for each entity, for example for each WSS list. For the dynamic model, a GetEntities call uses the same algorithm pointer for each list. This results in the efficient use of system resources and reduces the memory requirements for the business system.

In one embodiment, the static and dynamic metadata modules can be combined. In this embodiment, metadata database locations implementing a static model have the actual metadata stored in the metadata database. Metadata database locations implementing a dynamic model have pointers to an algorithm that provide the metadata independently of the metadata database. In another embodiment, dynamic metadata may be used for the entire model. In this embodiment, a metadata database may not be necessary and the algorithms may simply be stored in a file.

It is also possible to create a static model from a dynamic model. Any metadata objects obtained from dynamic metadata API function calls represents metadata obtained at a specific point in time. This information can be serialized to form a static model that represents a snapshot of the dynamic model at a point in time.

The example business data runtime module 302 also determines access permission for a metadata user. The access permission may be determined both statically and dynamically. An example of static access permission determination is an access control list for each metadata function. The access control list is used to statically determine which users have authorization to use a metadata function. The example algorithm module 502 may also provide a dynamic method of access control, by including functions that dynamically determine access permission. The algorithm module 502 may implement the dynamic access method by evaluating a plurality of factors before allowing access to a metadata function. For example, these factors may include the time of day, the day of the week, how busy the server is, etc. These factors may be used in addition to standard access control factors, such as whether the user's name is on an access control list.

Figure 6:
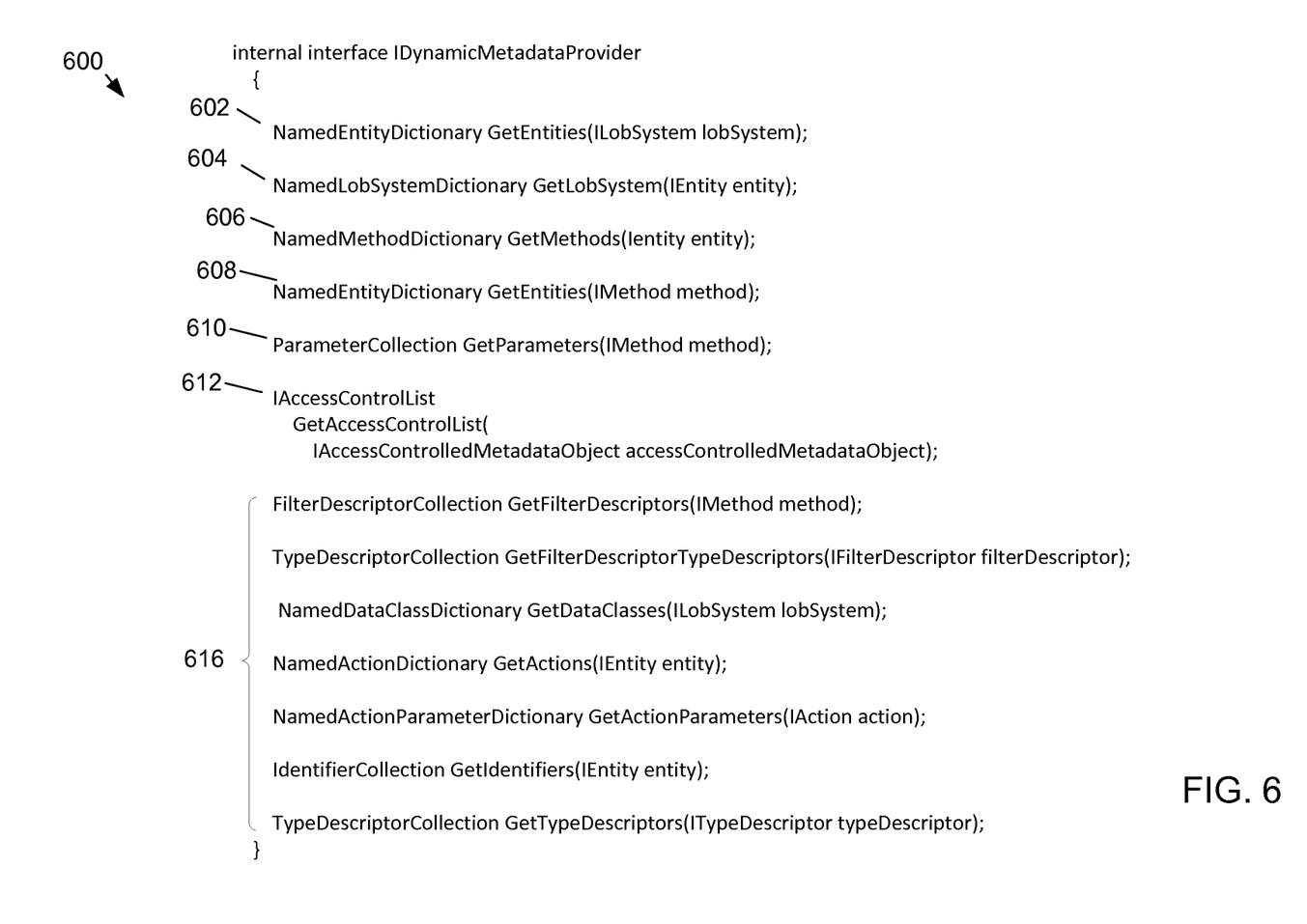
FIG. 6 shows an example embodiment of a metadata interface.

FIG. 6 shows an example embodiment of a metadata interface 600. Included are example metadata function definitions that are typically implemented in an algorithm registered for a specific business system. The example interface 600 provides an illustration of how metadata objects are interlinked. For example, the example GetEntities function 602 takes a line of business system (lobSystem) as a parameter and provides all the entities for that line of business system. By contrast, the example GetLobSystem function 604 takes an entity as a parameter and provides all the line of business systems associated with that entity. The example GetMethods function 606 takes an entity as a parameter and provides all the methods associated with that entity. By contrast, the example GetEntities function 608 takes a method as a parameter and provides all the entities associated with that method. Thus, it can be seen that entities are interlinked with line of business systems and entities are also interlinked with methods.

In a similar manner, the example GetParameter function 610 takes a method as a parameter and provides all the parameters associated with that method. The example GetAccessControlList function 612 takes a metadata object as a parameter and provides an access control list for that metadata object. The example metadata object may represent a specific user, for example.

Other example functions 616 of the interface 600 are also shown. It is understood that these are just examples of metadata functions. Other metadata functions are possible.

Figure 7:
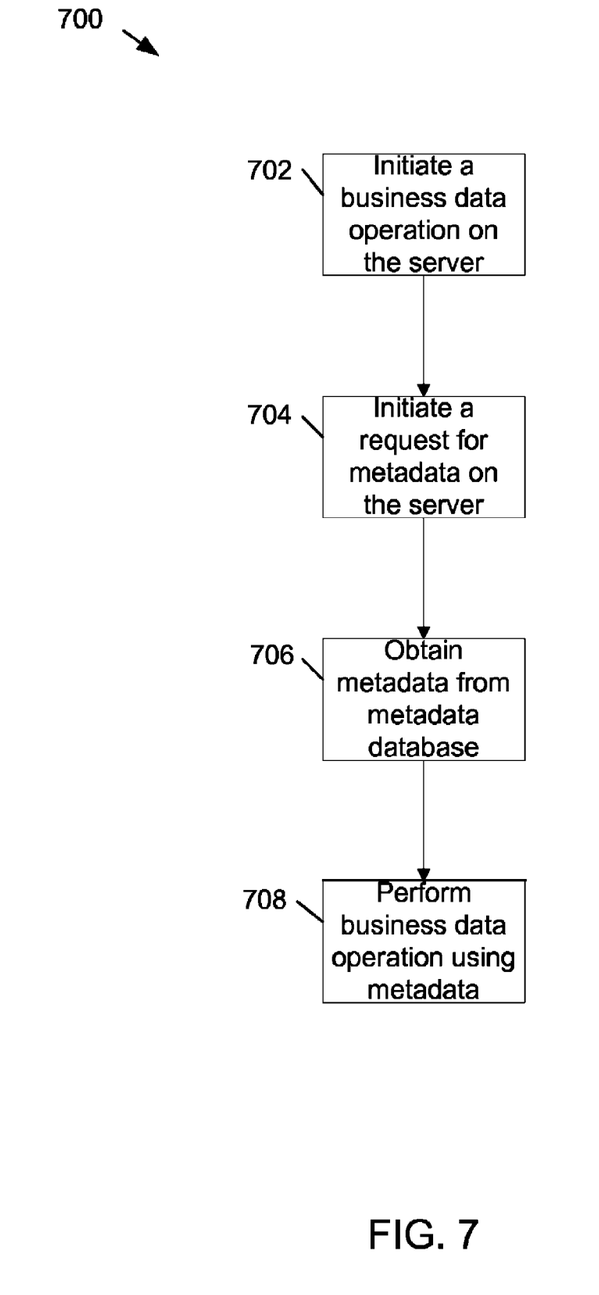
FIG. 7 shows a flowchart for an example method for obtaining metadata from a metadata database.

FIG. 7 shows an example flowchart for a method 700 for obtaining metadata from a metadata database using a static metadata model.

At operation 702, a business data operation is initiated on a server. For example, a business data operation can be to obtain employee information given an employee ID. At operation 704, the server initiates a request to a metadata database to return metadata relating to the business data operation. For example, the request can be to obtain a method for obtaining employee information. At operation 706, the metadata is obtained from the metadata database. At operation 708 the business data information is performed using the metadata. For example, employee information is obtained from the business system using the method (a business system API) returned from the metadata database.

Figure 8:
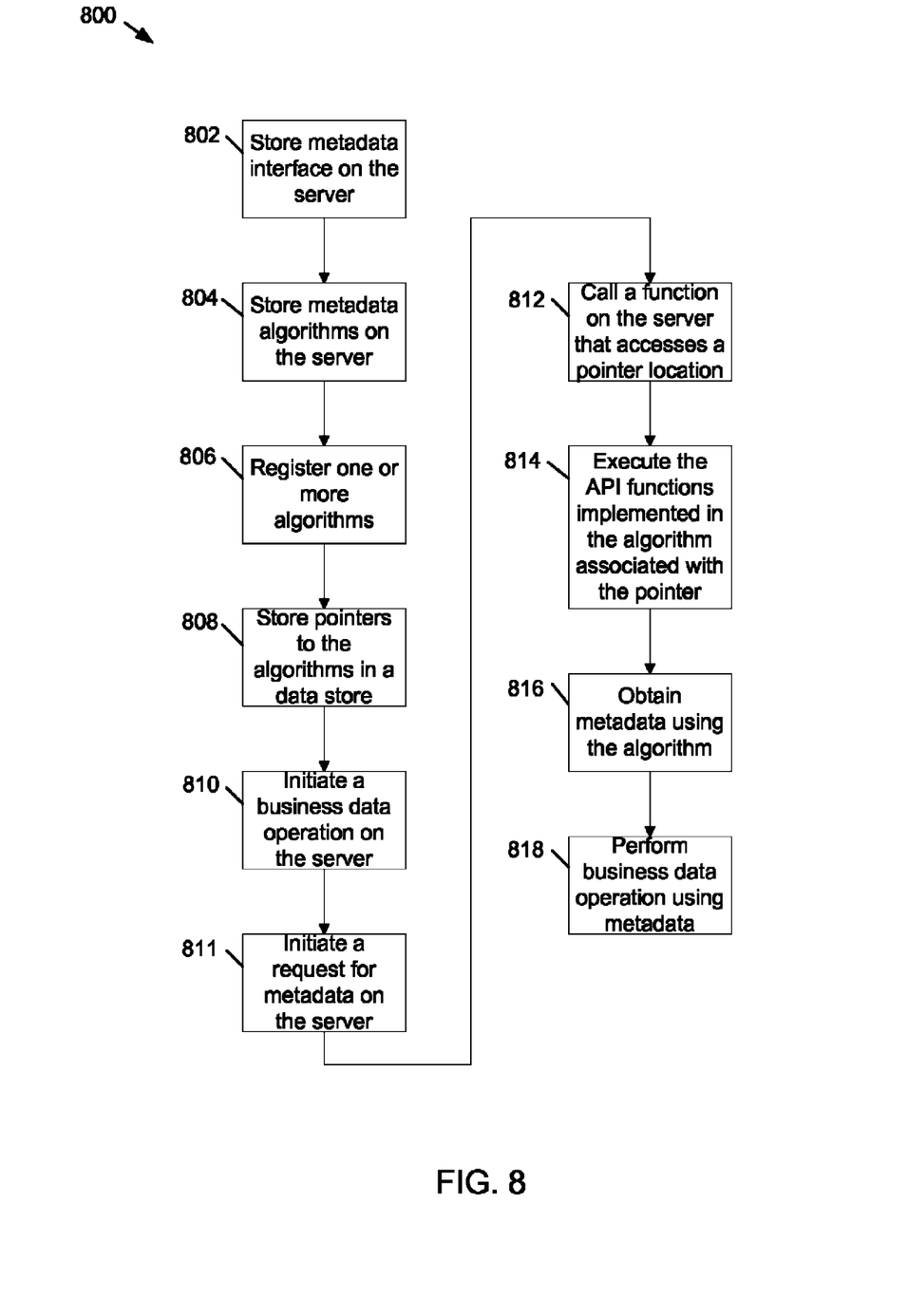
FIG. 8 shows a flowchart for an example method for dynamically obtaining metadata from a data store.

FIG. 8 shows an example flowchart for a method 800 for dynamically obtaining metadata from a data store.

At operation 802, a metadata interface is stored on a server. As described above, the metadata interface includes the definitions of one or more API functions used to obtain metadata. At least one of the API functions is structured to obtain metadata from a plurality of business systems. Since the interface typically does not change, operation 802 is typically performed only once per server.

At operation 804, one or more algorithms are stored on the server. Each of the one or more algorithms includes implementations of one or more of the API functions defined in the interface. The API function implementation may include one or more API functions specific to a business system. At operation 806, one or more algorithms are registered in a registration module on the server. Each of the one or more algorithms is registered for a specific business system. At operation 808, pointers to the registered algorithms are stored in a data store.

A pointer is stored for each registered algorithm, each pointer representing the server memory location of a registered algorithm. Operations 804-806 are typically performed once per business system whose metadata is to be obtained dynamically.

At operation 810, a business data operation is initiated on the server by the business data runtime module 302. For example, the business data operation may obtain customer information given a customer ID. At operation 811, the business data operation makes a request for metadata. At operation 812, the business data runtime module 302 calls an interface API function that accesses a data store location that contains one of the pointers. At operation 814, one or more of the interface API functions implemented in the algorithm associated with the pointer is executed. At operation 816, metadata is obtained from a metadata API function implemented in the algorithm. The metadata may be obtained by inferring the metadata from stereotypical behavior of the business system or the metadata may be obtained by using API calls specific to the business system to obtain data which is then transformed into metadata by the algorithm. At operation 818, a business data operation, for example obtaining customer information using the customer ID, is performed using the metadata. Operations 810-818 are repeated for each business data operation for which metadata is to be obtained dynamically.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device including a dynamic metadata model, the computing device comprising:
    a processing unit;
    a system memory;
    an interface module, the interface module including an interface that defines one or more first Application Programming Interface (API) functions for dynamically obtaining metadata for a plurality of business systems;
    an algorithm module, the algorithm module including two or more algorithms that implement the first Application Programming Interface (API) functions defined in the interface, each of the two or more algorithms providing metadata without accessing a metadata database, at least one algorithm using one or more second API functions to obtain data from a first business system and transform the data into metadata, at least one algorithm using stereotypical data patterns in one or more third Application Programming Interface (API) functions of a second business system to return metadata for the second business system, the two or more algorithms dynamically determining user access for the one or more first Application Programming Interface (API) functions by dynamically determining an access permission, the algorithm module implementing a dynamic access method by evaluating a plurality of factors prior to allowing access to a metadata function, the plurality of factors comprising a time of day, a day of a week and a server activity level, the plurality of factors being utilized in addition to at least one standard access control factor, the at least one standard access control factor comprising a determination as to whether a user's name is on an access control list; and
    a registration module that registers the two or more algorithms on the computing device, each of the two or more algorithms being associated with one of the plurality of business systems.

2. The computing device of claim 1, further comprising a metadata database that stores metadata objects associated with one or more of the business systems, the metadata objects including entities of the business systems, methods associated with the entities of the business systems, and parameters used by the methods, the metadata database storing pointers to the two or more registered algorithms, a registered algorithm associated with a pointer being executed when the metadata database location storing the pointer is accessed.

3. The computing device of claim 2, wherein the metadata objects are interlinked in a graph structure.

4. The computing device of claim 1, wherein each algorithm includes an Application Programming Interface (API) function that initializes the business system for which the algorithm is registered.

5. The computing device of claim 3, wherein the Application Programming Interface (API) function is a class constructor.

6. A method for obtaining metadata dynamically from a data store, the method comprising:
    storing a metadata interface on a computing device, the metadata interface including definitions of one or more first API functions for obtaining metadata from a plurality of business systems;
    storing one or more algorithms on the computing device, each of the algorithms implementing a first Application Programming Interface (API) function defined in the interface, at least one first Application Programming Interface (API) function implementation including calls to one or more second Application Programming Interface (API) functions specific to a first business system and another first Application Programming Interface (API) function implementation using stereotypical data patterns in one or more third Application Programming Interface (API) functions of a second business system, the one or more algorithms dynamically determining user access for the first Application Programming Interface (API) functions by dynamically determining an access permission, wherein an algorithm module implements a dynamic access method by evaluating a plurality of factors prior to allowing access to a metadata function, the plurality of factors comprising a time of day, a day of a week and a server activity level, the plurality of factors being utilized in addition to at least one standard access control factor, the at least one standard access control factor comprising a determination as to whether a user's name is on an access control list;
    registering the two or more algorithms on the computing device, each of the two or more algorithms registered for a specific business system;
    storing in the data store pointers to the two or more algorithms, a pointer being stored for each registered algorithm, each pointer representing the memory location of a registered algorithm;
    initiating an operation on the computing device to obtain metadata;
    calling a first Application Programming Interface (API) function on the computing device that uses a data store location in which one of the pointers is stored; and
    executing the called first Application Programming Interface (API) function.

7. The method of claim 6, wherein the interface includes an Application Programming Interface (API) function to obtain one or more entities associated with a business system.

8. The method of claim 6, wherein the interface includes an Application Programming Interface (API) function to obtain one or more business systems associated with an entity.

9. The method of claim 6, wherein the interface includes an Application Programming Interface (API) function to obtain one or more methods associated with an entity.

10. The method of claim 6, wherein the interface includes an Application Programming Interface (API) function to obtain one or more parameters associated with a method.

11. The method of claim 6, wherein the interface includes an Application Programming Interface (API) function to obtain security authorization information for a user of the metadata database.

12. The method of claim 6, wherein the interface includes an Application Programming Interface (API) function to initialize the interface.

13. The method of claim 6, further comprising including storing static metadata functions in the data store.

14. The method of claim 6, further comprising obtaining a static model from a dynamic model.

15. The method of claim 6, further comprising storing metadata for a plurality of instances of a business system.

16. A computer readable storage medium having computer-executable instructions that, when executed by a computing device, cause the computing device to perform steps comprising:

storing a metadata interface on the computing device, the metadata interface including definitions of one or more first Application Programming Interface (API) functions for obtaining metadata for a plurality of business systems;

storing two or more algorithms on the computing device, each of the two or more algorithms implementing one of the first Application Programming Interface (API) functions defined in the interface;

registering the two or more algorithms on the computing device, each of the two or more algorithms registered for a specific business system;

initiating an operation on the computing device to obtain metadata;

executing one or more of the first Application Programming Interface (API) functions implemented in the two or more algorithms to obtain metadata in at least one of:

using one or more second Application Programming Interface (API) functions specific to a first business system to obtain first data from the first business system and transforming the obtained first data into first metadata; and providing metadata using logic based on knowledge of stereotypical patterns in at least two third Application Programming Interface (API) functions specific to a second business system, the two or more algorithms dynamically determining user access for the one or more first Application Programming Interface (API) functions by dynamically determining an access permission, the algorithm module implementing a dynamic access method by evaluating a plurality of factors prior to allowing access to a metadata function, the plurality of factors comprising a time of day, a day of a week and a server activity level, the plurality of factors being utilized in addition to at least one standard access control factor, the at least one standard access control factor comprising a determination as to whether a user's name is on an access control list.

\* \* \* \* \*

UNITED STATES PATENT AND TRADEMARK OFFICE
CERTIFICATE OF CORRECTION

PATENT NO.         : 8,484,204 B2                                Page 1 of 1
APPLICATION NO.    : 12/200495
DATED              : July 9, 2013
INVENTOR(S)        : Kapadia et al.

It is certified that error appears in the above-identified patent and that said Letters Patent is hereby corrected as shown below:

In the Specification

In column 4, line 31, delete "nonvolatile" and insert -- non-volatile --, therefor.

Signed and Sealed this
Third Day of February, 2015

Michelle K. Lee
*Deputy Director of the United States Patent and Trademark Office*